Sept. 30, 1941.  C. P. O'CONNOR  2,257,122
TYPE SOLDERING GAUGE
Filed June 23, 1939   2 Sheets-Sheet 1
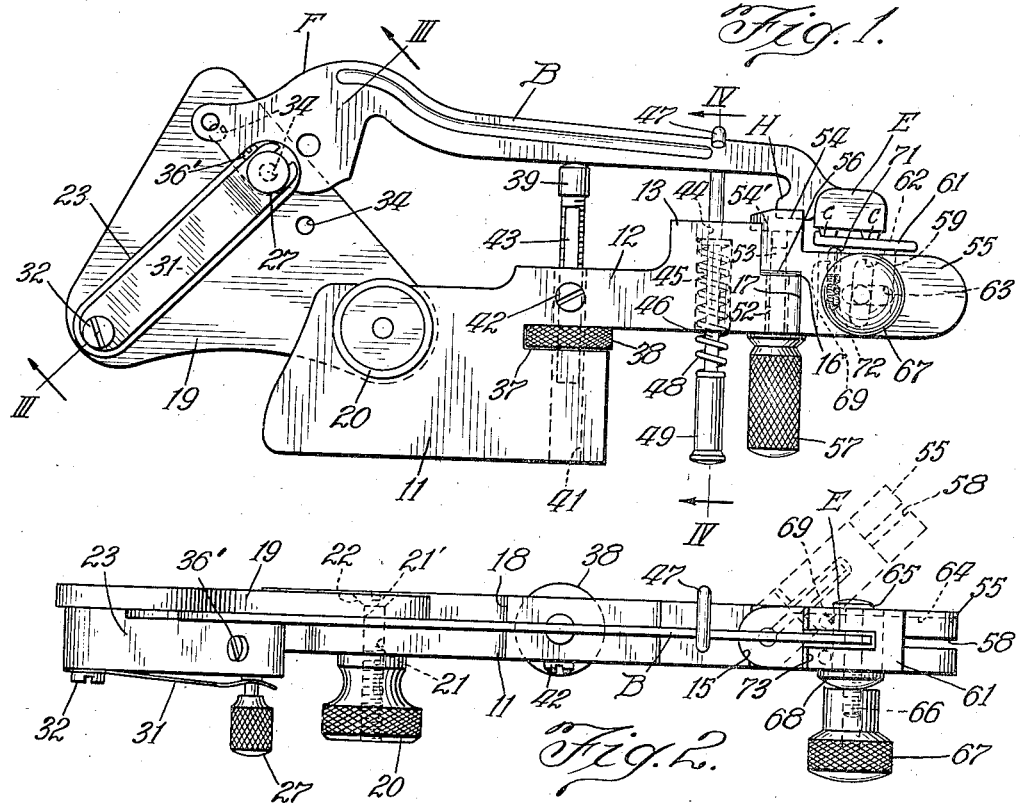
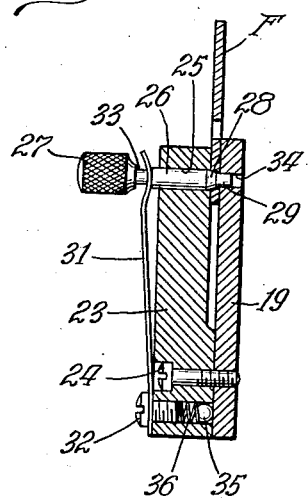
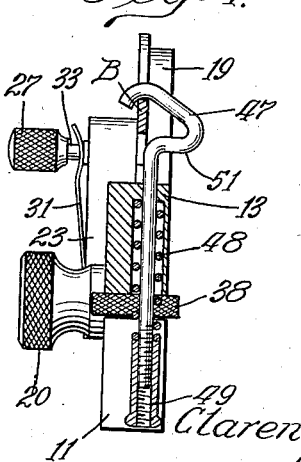
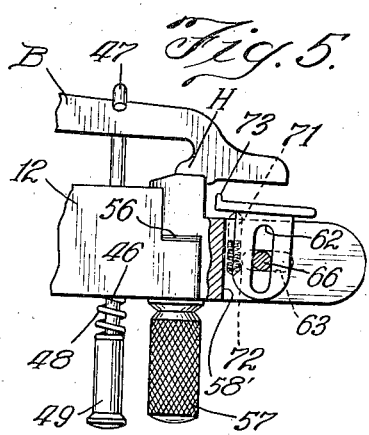
Inventor:
Clarence Patrick O'Connor
By John A. Watson
Atty.

Sept. 30, 1941.  C. P. O'CONNOR  2,257,122
TYPE SOLDERING GAUGE
Filed June 23, 1939  2 Sheets-Sheet 2
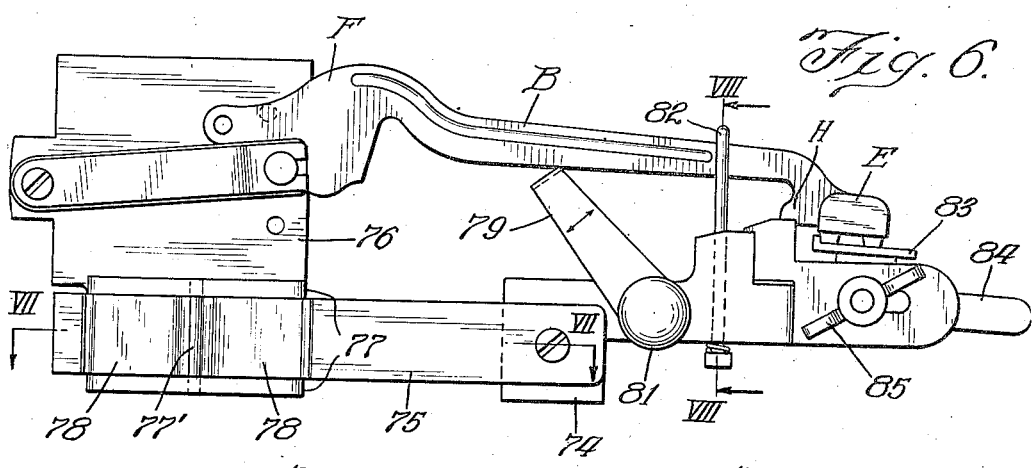
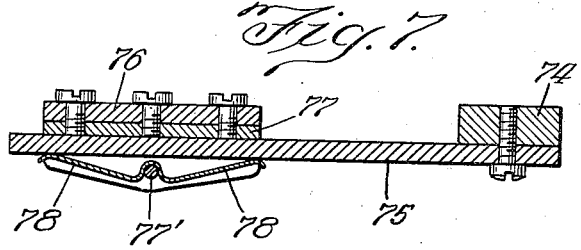
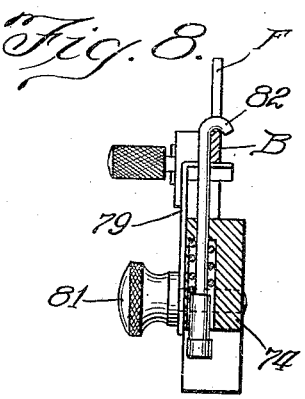
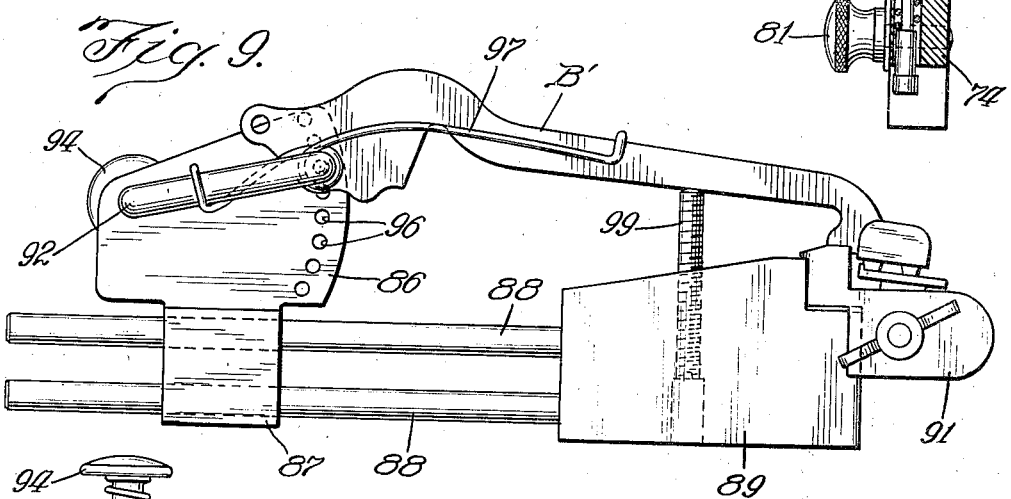
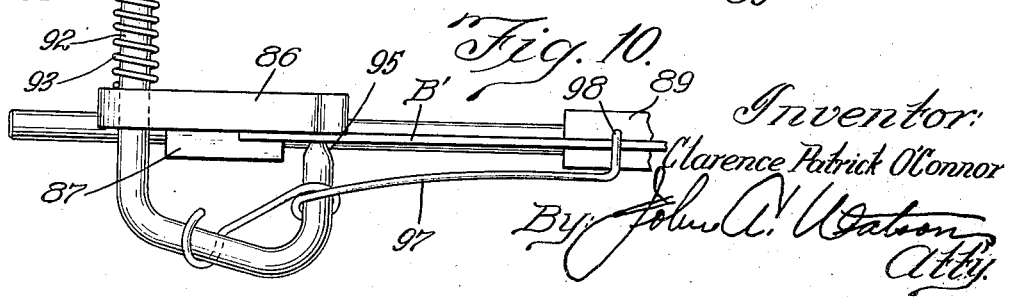
Inventor:
Clarence Patrick O'Connor
By John A. Watson
Atty.

Patented Sept. 30, 1941

2,257,122

UNITED STATES PATENT OFFICE 2,257,122

TYPE SOLDERING GAUGE

Clarence Patrick O'Connor, Chicago, Ill., assignor to Ames Supply Company, Chicago, Ill., a corporation of Illinois Application June 23, 1939, Serial No. 280,718

11 Claims. (Cl. 113—99)

This invention hereinafter disclosed relates to a device or apparatus designed to support and to secure a typewriter or the like, type-bar and type-element assembly, in such manner that the type-bar and the type-element occupy predetermined relations to one another during the renewal and replacement of either so that the type-element, when fastened to the type-bar and when the type-bar-element assembly is properly disposed or replaced in the machine of which it is a part, may assume its correct position for proper functioning.

The invention may have its greatest usefulness in the repair of typewriters and other machines of similar nature where, for instance, the type-bar of a type-bar and type-element sub-assembly must be replaced or, where, as is more often the case the type or type-element must be removed and replaced although the type-bar part of the assembly may be reused. In either of such events it is desirable if not necessary to replace the bar or the element, as the situation demands with the new bar or the new element positioned in as nearly the same or exact position or relation to the retained element or retained bar to which it is to be secured as the old bar or old element removed bore to the retained element or retained bar, respectively. In other words if it be desired, for example, to replace a worn type-element and the old bar is still useful, the new type-element should be so positioned and secured to and with respect to the bar which is to carry it that the type characters on the new element will occupy exactly the same position as was occupied by the type characters on the element replaced, assuming, of course, that the replaced element had been located in its correct position before replacement.

Ordinarily the types or type-elements are secured to the type-bars by soldering and in the manufacture of a typewriter the type-elements usually are soldered to the type-bars after the type-bars are assembled in their proper relation in that portion of the typewriter or the like known as the type-bar segment, the segment with the type-bars assembled therein being mounted in a jig or fixture of such character and arrangement that the type-elements may be soldered to the respective type-bars in succession or in some other predetermined order. Such jigs or fixtures are relatively expensive and otherwise unsuited to typewriter repairs which are generally made at the place where the typewriter is located for use. Furthermore the use of such manufacturing jigs or fixtures for repair purposes would require the disassembly of the typewriter and the removal of the type-bar segment. With the type soldering gauge or fixture disclosed herein, the operator (repair man) may easily transport it to the typewriter to be repaired and at such location need only remove that type-bar or those type-bars and the attached type-element or elements which may need to be replaced or repaired.

Accordingly, the primary object of the invention is to provide a relatively simple and inexpensive gauge or portable fixture by which a type-bar and the attached type-element may be secured and either part thereof held in fixed position or the relative location thereof determined while the other part is replaced, the construction and arrangement being such that the new part may be positioned quickly and accurately in exactly the same functioning relationship to the other part as the removed part occupied with respect to the said other part retained for reuse.

Another important object of the invention is to provide a device of a character described which will accommodate or interchangeably receive the type-bars and type-elements of a large number of standard full sized typewriters and the type-bars of so called portable typewriters. In this connection it may be noted any of the several forms of the invention illustrated and described herein will receive and position, for the purposes indicated, any of considerably over fifty different kinds or forms of type-bar now commonly utilized in different makes of standard and portable typewriters and similar machines now on the market.

A further important object of the invention is to provide a device of the character described which is not only portable and relatively inexpensive to manufacture but one which is simple and easy to use and which will simplify the operations and reduce the time required to solder type-elements to type-bars to a very substantial degree.

Many other objects as well as the advantages and uses of the invention will be or should become apparent and well understood after reading the following description of the preferred form and the several modifications of the invention all of which are full illustrated in the accompanying drawings in which:

Fig. 1 is a side elevational view of a preferred form of the invention in which a type-bar with a type-element attached thereto has been illustrated in a position of or for replacement.

Fig. 2 is a top plan view of the device, type-bar and type-element illustrated in Fig. 1.

Fig. 3 is a sectional view taken along the line III—III of Fig. 1 and looking in the direction of the arrows.

Fig. 4 is a sectional view taken along the line IV—IV of Fig. 1, looking in the direction of the arrows.

Fig. 5 is a fragmentary view in side elevation of the right hand end portion of the showing in Fig. 1, with parts broken away to illustrate certain details.

Fig. 6 is a side elevational view of a modified form.

Fig. 7 is a sectional view taken along the line VII—VII of Fig. 6.

Fig. 8 is a sectional view taken along the line VIII—VIII of Fig. 6 and,

Figs. 9 and 10, respectively, are a side elevational view and a fragmentary top plan view of another modified or alternative form of the invention.

The preferred form of the invention illustrated in Figs. 1 to 5 inclusive includes a base block, body, or what may be termed a support member 11 which may be of a shape other than that shown, but which, conveniently, may be shaped as illustrated. Projecting from one side of the support member or body 11 at a top portion thereof is an integral part 12 having an upstanding portion 13 which is provided with a concave semi-cylindrical recess 15 which terminates at a horizontal shoulder 16 located at the top of a convex semi-cylindrical end portion 17.

At what may be termed the rear end of the support member or body 11, the body is cut away at one side providing a recess 18 which opens rearwardly and upwardly and is adapted to receive a type-bar fulcrum-end support 19 therein. A transverse bore 21 through the body 11 is aligned with a transverse bore 21' in the type-bar end support 19 for the reception of a screw or the like 22 about which the type-bar fulcrum-end support 19 is adapted to swivel or swing with respect to the body 11 although the pivot screw 22 may be secured to either the support 19 or the body 11 if it may swivel with respect to the other. A clamp nut 20 is threaded on to the screw 22 and when tightened down against the body 11 will secure the support 19 in any adjusted position.

The type-bar fulcrum end support 19 carries an adjustable arm 23 which at one end is pivoted to the support 19 on a fixed pivot 24 and which at its other end is transversely drilled as at 25 for the reception of a pin 26 which at its outer end carries a knurled finger knob 27 and at its inner end is reduced to provide a tapered portion 28 and a still further reduced step portion 29. A leaf spring 31 secured to the arm 23 at one end by a screw or other means 32 and forked at its opposite ends to receive and closely surround the stem of the pin 26, engages the stem 33 and normally urges the stem to the right (viewing Fig. 3) so that the reduced step 29 will be projected into one of a series of depressions or bores 34 formed in the fulcrum end support 19. If desired the tension on the spring 31 and the friction between arm 23 and support 19 may be varied by placing a ball 35 in the bottom of the bore in which the pivot screw 32 is threaded and by placing a coil spring 36 between the ball 35 and the inner end of screw 32 so that when the screw is turned the tension of the spring 36 is varied. A set screw 36' carried by the swinging end of arm 23 may engage with shoulders (not shown) formed at opposite ends of an elongated flat on one side of the pin 26 so as to secure the pin against unintentional displacement from the arm 23, as will be understood.

The body 11 is provided with a transverse horizontally disposed slot 37 for the reception of a knurled adjusting screw nut 38 of sufficient diameter to project laterally beyond the sides of body 11. Nut 38 is threadedly engaged with the threads of an adjustment screw 39 adapted to be moved up and down in a vertical bore 41 in body 11 while a set screw 42 projecting laterally into bore 41 and into the path of opposed shoulders at the ends of an elongated flat 43 on one side of screw 39 prevents accident displacement of screw 39 from and rotation of this screw 39 within its bore. A vertical bore 44 and a concentric counter-bore 45 in the projecting part 12 of body 11 receive the stem 46 of a hold-down hook 47 for vertical sliding movements, the stem and hook normally being urged downwardly under the influence of a coil spring 48 which at one end seats at the inner end of the counter-bore and at its other end against a shoulder provided by a finger grip 49 threadedly engaged with stem 46 for varying the tension upon spring 48. The hook 47 has an off-set portion 51 which may also serve the function of a hook under some conditions of use and with certain kinds of type-bar.

Vertically disposed through the semi-cylindrical end portion 17 of projection 12 is a bore 52 through which a pivot screw 53 passes for threaded engagement with a portion 54 of what may be termed a swinging anvil carrier 55, one or more washers 56 being disposed between the shoulder 16 and an oppositely facing shoulder formed on the portion 54. The portion 54 is provided with a slot 54' for purposes hereinafter described. A knurled clamp nut 57 is secured to the screw 53 so that screw 53 may be rotated thereby to clamp the swivelled anvil carrier 55 in any position to which it may be swung laterally of the body 11. That part of portion 54 which lies adjacent to the cylindrical recess 15 is made convexly cylindrical to fit the recess and that portion of the anvil carrier 55 which lies adjacent to the convexly semi-cylindrical portion 17 is formed to provide a semi-cylindrical recess conforming to the semi-cylindrical portion 17 as will be understood so that the anvil carrier 55 may be swung about the pivot 53 to either side of the body 11 and projection 12 and through a substantial angle which, preferably, may be slightly over 110° in extent.

The anvil carrier 55 is provided with a longitudinally extending and vertically directed slot 58 in its outer end portion, and inner terminus of this slot being indicated at 58' in Fig. 5. Within the slot 58 and vertically and horizontally movable therein is a dependent shank portion 59 of an anvil or type-element rest 61 with which it is integral. The shank portion 59 is centrally apertured to provide an elongated slot 62 the long axis of which extends in a vertical direction and, similarly, both sides of the anvil carrier 55 are apertured to provide elongated slots 63 the long axes of which extend horizontally in register with one another. One side of the anvil carrier 55 may be channeled as indicated at 64 (Fig. 2) to receive the head 65 of a clamp screw 66 and to hold the same against rotation while permitting the clamp screw to be slid longitudinally of the slot 63. A knurled clamp nut 67 threads on to the stem of the clamp screw 66 while interposed between the clamp nut 67 and the anvil carrier 55 is a cup washer 68. The screw 66 not only passes through the slots 63 but also through the slot 62 so that the anvil 61 may be adjusted in two directions. Each half or side of the anvil carrier 55 is vertically drilled from its upper surface to provide bores 69 within which small plungers 71 supported upon springs 72 are disposed, the arrangement being such that the plungers 71 are urged upwardly by the springs 72 against the bottom portions of the anvil 61 thereby to urge the rear or inner end of the anvil upwardly and forwardly. The anvil 61 has a flat top face terminating at the rear or inner edge in a positioning lip 73 which extends continuously therealong.

Operation

In describing the operation of this form of the invention it will be assumed that one desires to replace the type or type-element E shown in Fig. 1 as attached to or in position to be attached to type-bar B which is representative of one standard make of type-bar for a standard typewriter. The type-bar with its type-element attached is removed from the typewriter and positioned on the gauge with its fulcrum end F so disposed with respect to the type-bar fulcrum end support 19 that the fulcrum pin or wire opening or slot (as the case may be) of the type-bar is disposed in register with one or another of the holes or depressions 34 and the swinging arm 23 is moved to a position where it overlies the type-bar fulcrum end F and in such position that the step 29 of the pin 26 will pass through the fulcrum wire aperture into the depression or aperture 34 which is in register therewith. At this time the tapered step 28 will engage with the sides of the slot of the fulcrum wire slot or aperture in the type-bar fulcrum end thereby to position and pivotally to secure the same. During these operations the adjustable abutment screw 39 may be disposed at one of its lowered portions, the hook 47 will be down and out of the way and the clamp screws 20 and 57 will be released thereby permitting the fulcrum end support 19 and the anvil carrier 55 to swivel free.

The type-bar is usually provided with a heel portion H which is then disposed in the slot 54' with the type-element E disposed over the top face of the anvil 61, and, preferably, in such position that the lip 73 of the anvil is located behind the lower case type character "c." Upon the completion of this positioning the clamp screws 20 and 57 may be tightened respectively t clamp the fuclrum end support 19 and the anvil carrier 55 relatively rigidly with respect to one another, the hook 47 or the offset portion 51 of the hook is engaged over the top of the type-bar B and the adjustable abutment screw 39 is moved upwardly into engagement with the bottom edge of the type-bar. The clamp nut 67 may then be released to permit the plungers 71 to move the anvil 61 upwardly until the top face of the anvil engages with the bottom faces of the lower case type-element c and the upper case type character C at which time the anvil is moved forward to bring the lip 73 against the rear edge of the lower case character "c." When the lip is against the end of the lower case type character and the upper and lower case character faces lie flat against the type surface of the anvil 61, the clamp nut 67 is tightened to secure the anvil to adjusted position. It will be understood of course that different kinds of type-bars will take different positions with respect to the device and that the number and spacing or portions of the holes or depressions 34 in the fulcrum support 19 will be such as to accommodate various kinds of type-bars.

The above described method of positioning the type-bar and type-element assembly in the apparatus is considered the preferable method but, as will be appreciated, those skilled in the art may follow a different sequence of steps. In any event the main purpose is to secure the type-bar B in relatively fixed position and while in such position to gauge or determine the position of the type-element which is to be removed so that a new type-element may be secured to the type-bar in exactly the same position as that occupied by the type-element which has been removed. With the type-bar and type-element assem' secured as described, heat is applied to the old element until the solder holding it to the type-bar has melted at which time the old element may be removed. A new element is then put in place on the anvil in the identical position previously occupied by the old element and solder is run into the joint between the element and the bar end. When the solder has cooled and hardened the type-bar with the new element is removed from the apparatus and may be replaced in the typewriter with assurance that the upper and lower case characters will strike the ribbon and platen in the same places at which the upper and lower case characters of the old type element previously struck.

The form of the invention illustrated in Figs. 6, 7 and 8 differs from the preferred embodiment in a few constructional details, but is substantially the same in functional features and operation. A support 74 carries a slide bar 75 rigidly secured thereto and a type-bar fulcrum end support 76 carries a U shaped guide 77 between the arms of which the slide bar 75 is adapted to slide back and forth in the direction of the slide bar length. A pin 77' is fastened in the opposite sides of the guide 77 intermediate of the ends thereof and serves as a reaction abutment for the opposite end portions 78 of a leaf spring adapted to exert enough pressure against the slide bar 75 frictionally to hold the slide bar at any adjusted position in guide 77. Other features of the type-bar fulcrum end support are so closely similar to the preferred embodiment that they need no further description here. The adjustable abutment support 79 of this embodiment corresponds to the abutment support screw 39 but is an L shaped plate adapted to be swung in the directions indicated by the double arrow and to be secured in adjusted position by a clamp screw 81. The hold down hook 82 corresponds to the hold down hook 47 although it is slightly different in construction. The anvil 83 is very similar to the anvil 61 and is mounted and arranged for adjustment in the same manner although in this form the plungers 71 are omitted and the anvil is manually raised and lowered and otherwise manipulated by a flat tongue-like finger piece 84, a wing nut 85 serving to clamp the anvil in adjusted position.

In the modified form shown in Figs. 9 and 10, the type-bar fulcrum support 86 carries a depending portion 87 provided with parallel bores adapted snugly but slidably to receive and to slide upon guide rods 88 secured to a base member or support 89 for adjustment of the fulcrum end support toward and from the anvil carrier 91. The fulcrum end support 86 carries a U-shaped plunger bar 92 about a handle portion of which is a coil spring 93 abutting at one end at the support 86 and in the other end against a handle 94 thereby to urge the rod upwardly in the plane of the sheet viewing Fig. 10, thereby to urge the pin pointed end 95, which corresponds to the pin 26, through the type-bar fulcrum opening and into one of a plurality of holes or recesses 96. Carried by the plunger bar 92 is a spring 97 the outer end 98 of which is adapted to be placed over the type-bar B' thereby to hold the type-bar down against adjustable abutment screw 99 carried by the base of support 89. The operation of this device is similar to the operation of the devices above described.

While I have illustrated and described three embodiments of my invention, it will be understood and appreciated that the invention is capable of embodiment in many other forms which might bear little resemblance in construction and arrangement to any of the embodiments illustrated herein, and, also, that various changes may be made in the details of construction and operation of the embodiments disclosed. Consequently, I do not wish to be limited except by the spirit of the invention and the scope of the appended claims.

I claim:

1. In a device of the character described, means providing a support adapted to engage the face and one edge portion of a type character on a type-element while the element is secured to the type end of a type-bar for positioning said element, means mounting said support for adjustment in a plurality of planes at angles to one another, means for engaging and securing the fulcrum end of the said type-bar, said fulcrum engaging means being associated with said support for adjusting movements toward and from the same substantially in the direction of the length of the type-bar, and means for securing said fulcrum portion engaging means in substantially fixed adjusted position relative to said support.

2. In a device of the character described, means providing a normally horizontal support adapted to engage the face and one edge portion of a type character on a type-element while the element is secured to the type end of a type-bar for positioning said element, a support carrier means, means pivotally connecting said support and said carrier means on a substantially vertical axis, means for securing said support and carrier means against relative pivotal movement about said axis, means for engaging and securing the fulcrum end of the said type-bar, said fulcrum engaging means being mounted on said carrier means and associated with said support for adjusting movements toward and from the same substantially in the direction of the length of the type-bar, and means for relatively rigidly securing said fulcrum portion engaging means in substantially fixed adjusted position relative to said support.

3. In a device of the character described, means providing a support adapted to engage the face and one edge portion of a type character on a type-element while the element is secured to the type end of a type-bar for positioning said element, means mounting said support for swinging movements about an axis substantially perpendicular to the plane of the face of the type character, means including a plurality of latch depressions arranged in spaced array and a latch pin mounted for selective placement in said depressions for engaging and securing the fulcrum end of the said type-bar, means connecting said fulcrum engaging means with said support, means for adjusting said fulcrum engaging means relative to said connecting means toward and from the said support and substantially in the direction of the length of the type-bar, and means for securing said fulcrum portion engaging means in substantially fixed position relative to said support.

4. In a device of the character described, means providing a support adapted to engage the face and one edge portion of a type-character on a type-element while the element is secured to the type end of a type-bar and to secure said type-bar end and said type-element in relatively fixed predetermined position whereby to position said element, means for engaging and securing the fulcrum portion of the fulcrum end of said type bar, means mounting said fulcrum engaging and securing means for shifting movements toward and from said supporting means in a plane in space substantially perpendicular to the plane of the face of said type-character, and means for relatively fixedly securing said fulcrum engaging and securing means in any adjusted position to which it may be shifted.

5. In a device of the character described, means providing a support adapted to engage the face and one edge portion of a type-character on a type-element while the element is secured to the type end of a type-bar for positioning said element, means for engaging and securing the fulcrum portion of the fulcrum end of said type-bar, means mounting said fulcrum engaging and securing means for swinging movements thereof toward and from said supporting means in a plane in space substantially perpendicular to the plane of the face of said type-character, and means for securing said fulcrum engaging and securing means in any position to which it may be swung.

6. In a device of the character described, means providing a support adapted to engage the face and one edge portion of a type-character on a type-element while the element is secured to the type end of a type-bar for positioning said element, means including a plurality of spaced latch depressions and a latch pin cooperative therewith for engaging and securing the fulcrum portion of the fulcrum end of said type-bar, means pivotally mounting said fulcrum engaging and securing means for swinging movements toward and from said supporting means in a plane in space substantially perpendicular to the plane of the face of said type-character, and means for securing said fulcrum engaging and securing means in any position to which it may be swung.

7. In a device of the character described, means providing a type element support adapted to be engaged by and to position type characters on a type element while the element is attached to a type-bar, a type-bar holder including means carried thereby adapted to engage and to secure the type-bar by a part of the bar which part is spaced from said element, a rigid guide associating said support and holder carried means, said holder being slidably mounted on said guide for movements of said holder carried means toward and from said support, spring means between said guide and holder for clamping said holder frictionally against said guide thereby to secure said holder against accidental movements relative to said guide.

8. In a device of the character described, means providing a type element support adapted to be engaged by and to position type characters on a type element while the element is attached to a type-bar, a type-bar holder including a swinging arm and a pin carried thereby and adapted to engage and to secure the type-bar by that part of the bar which has the fulcrum opening therein, said pin being disposed in said fulcrum opening, means associating said support and holder for movements of said holder toward and from said support in a plane substantially perpendicular to the plane of the striking face of the type characters, and means for securing said holder, said arm and said pin against movements relative to said support.

9. In a device of the character described, means providing a type element engaging member adapted to be engaged and to be positioned in predetermined relation to type characters on a type element while the element is attached to a type-bar, resilient means normally urging said engaging member toward type element engaging position, means for securing said member in such predetermined relation, a type-bar holder including means carried thereby and adapted to engage and to secure the type-bar by a part of the bar which part is spaced from said element, means associating said support and holder carried means for movements of said holder carried means toward and from said support, and means for securing said holder carried means against movements relative to said engaging member.

10. In a device of the character described, means for supporting and securing a type-bar in a position predetermined in part by the position of a type element secured to said bar, and means for determining the position of the type element comprising, a member adapted to seat against the type character striking face, resilient means normally tending to urge said member toward the type character striking face, and means for securing said member against movement under the influence of said resilient means.

11. In a device of the character described, a support, means carried by said support for securing a type-bar in a relatively fixed selective position with respect thereto and with respect to a type element secured to said bar, resiliently mounted means adapted to engage the type element secured to said bar and to be positioned thereby in predetermined relation to said type element, and means for securing said resiliently mounted means relative to said support.

CLARENCE PATRICK O'CONNOR.